(12) United States Patent
Egner-Walter et al.

(10) Patent No.: US 9,393,935 B2
(45) Date of Patent: Jul. 19, 2016

(54) WIPER BLADE

(75) Inventors: Bruno Egner-Walter, Heilbronn (DE); Michael Schauble, Vaihingen/Enz (DE)

(73) Assignee: Valeo Systemes d'Essuyage, La Verriere (FR)

( * ) Notice: Subject to any disclaimer, the term of this patent is extended or adjusted under 35 U.S.C. 154(b) by 30 days.

(21) Appl. No.: 13/202,673

(22) PCT Filed: Mar. 22, 2010

(86) PCT No.: PCT/EP2010/001785
§ 371 (c)(1),
(2), (4) Date: Aug. 22, 2011

(87) PCT Pub. No.: WO2010/133269
PCT Pub. Date: Nov. 25, 2010

(65) Prior Publication Data
US 2011/0302738 A1    Dec. 15, 2011

(30) Foreign Application Priority Data
Mar. 25, 2009  (DE) .......................... 10 2009 014 313

(51) Int. Cl.
*B60S 1/38*   (2006.01)
*B60S 1/52*   (2006.01)

(52) U.S. Cl.
CPC ............... *B60S 1/381* (2013.01); *B60S 1/3879* (2013.01); *B60S 1/524* (2013.01)

(58) Field of Classification Search
CPC ...... B60S 1/3806; B60S 1/3874; B60S 1/381; B60S 1/3808
USPC ............ 15/250.04, 250.01, 250.02, 15/250.05–250.09, 250.43, 250.44, 15/250.361, 250.32, 250.201; 219/202; 239/284.1
See application file for complete search history.

(56) References Cited

U.S. PATENT DOCUMENTS

| | | | | |
|---|---|---|---|---|
| 4,976,001 A * | 12/1990 | Wright | ....................... | 15/250.48 |
| 7,228,588 B2 * | 6/2007 | Kraemer et al. | ......... | 15/250.201 |
| 2003/0019066 A1 * | 1/2003 | Egner-Walter | ............. | 15/250.04 |
| 2003/0159229 A1 * | 8/2003 | Weiler et al. | ............... | 15/250.201 |
| 2004/0111820 A1 * | 6/2004 | Aoyama et al. | .......... | 15/250.201 |
| 2006/0090282 A1 * | 5/2006 | Hoshio | ....................... | 15/250.44 |
| 2006/0107485 A1 * | 5/2006 | Kim | .......................... | 15/250.201 |
| 2006/0156529 A1 * | 7/2006 | Thomar et al. | .................. | 29/450 |
| 2007/0061994 A1 * | 3/2007 | Lee | ........................... | 15/250.201 |
| 2007/0113367 A1 * | 5/2007 | Boland et al. | ............ | 15/250.201 |

(Continued)

FOREIGN PATENT DOCUMENTS

| | | |
|---|---|---|
| DE | 100 00 379 A1 | 8/2001 |
| DE | 100 07 800 A1 | 8/2001 |

(Continued)

OTHER PUBLICATIONS

WO2009118286A1 (machine translation), 2009.*

(Continued)

*Primary Examiner* — Monica Carter
*Assistant Examiner* — Andrew A Horton
(74) *Attorney, Agent, or Firm* — Osha Liang LLP

(57) ABSTRACT

Wiper blade for windscreen wiper modules for vehicles and in a design as a flat wiper blade, with a wiping rubber forming a wiping lip with at least one spring rail connected to the wiping rubber and in addition with at least one spoiler profile connected to the wiping rubber and to the at least one spring rail and manufactured as an independent profile.

19 Claims, 3 Drawing Sheets

(56) References Cited

U.S. PATENT DOCUMENTS

| | | |
|---|---|---|
| 2008/0034530 A1* | 2/2008 | Breesch .................. 15/250.201 |
| 2008/0052865 A1* | 3/2008 | Chiang ..................... 15/250.43 |
| 2008/0201894 A1* | 8/2008 | Ko .......................... 15/250.201 |
| 2008/0216274 A1* | 9/2008 | Egner-Walter et al. .... 15/250.02 |
| 2010/0218333 A1* | 9/2010 | Ritt ......................... 15/250.201 |

FOREIGN PATENT DOCUMENTS

| | | | |
|---|---|---|---|
| DE | 100 33 779 A1 | 5/2002 | |
| DE | 101 20 467 A1 | 10/2002 | |
| DE | 10323998 A1 * | 12/2004 | ............... B60S 1/38 |
| DE | 102005030972 A1 * | 1/2007 | ............... B60S 1/38 |
| DE | 10 2006 013 900 A1 | 9/2007 | |
| WO | WO 0149537 A2 * | 7/2001 | ............... B60S 1/38 |
| WO | WO 2008099056 A1 * | 8/2008 | ............... B60S 1/38 |
| WO | WO 2009000498 A1 * | 12/2008 | ............... B60S 1/38 |
| WO | WO 2009033885 A1 * | 3/2009 | ............... B60S 1/38 |
| WO | WO 2009118286 A1 * | 10/2009 | ............... B60S 1/38 |

OTHER PUBLICATIONS

DE102005030972 (machine translation), 2007.*
DE10323998 (machine translation), 2004.*
International Search Report w/translation from PCT/EP2010/001785 dated Jun. 4, 2010 (4 pages).

\* cited by examiner

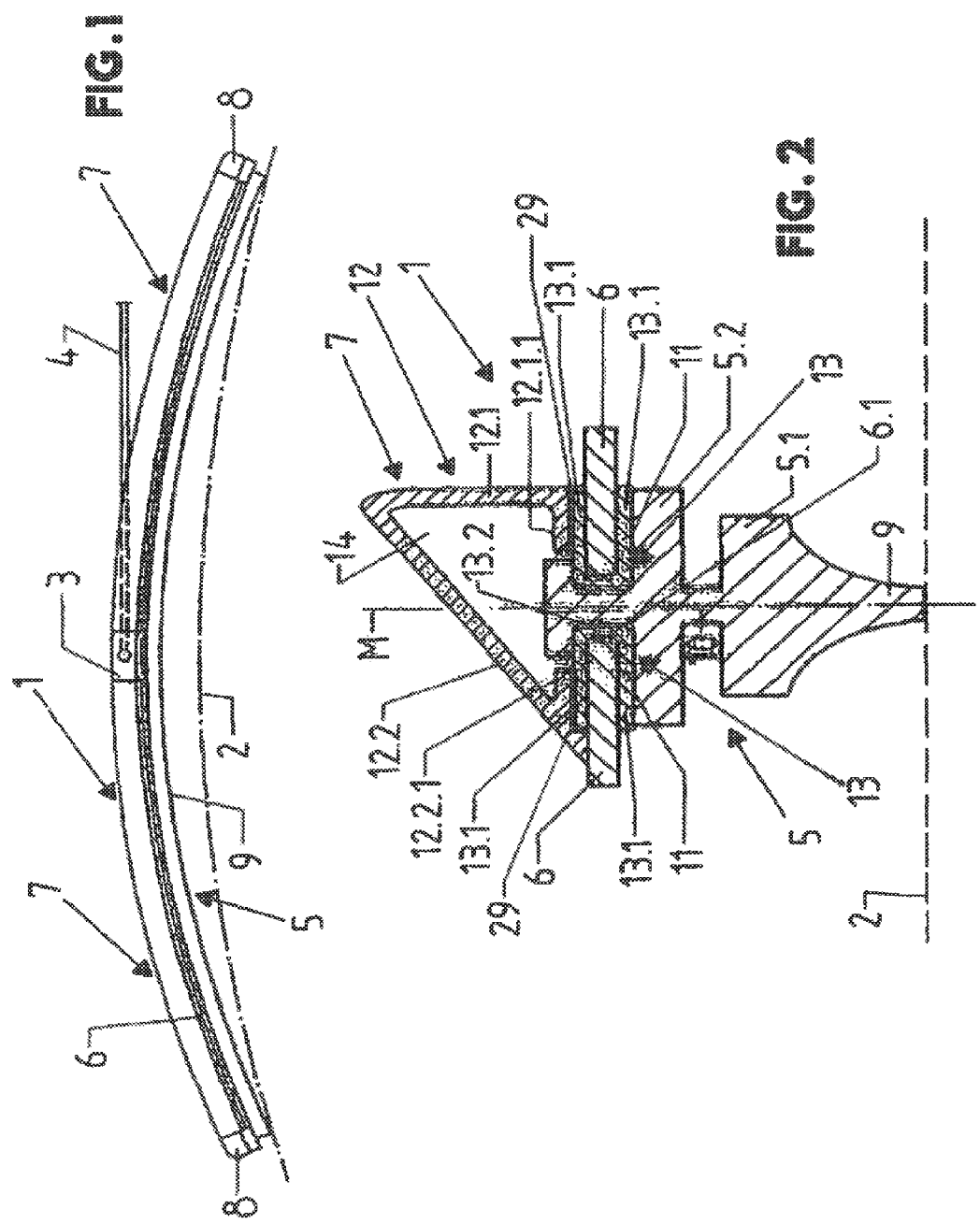

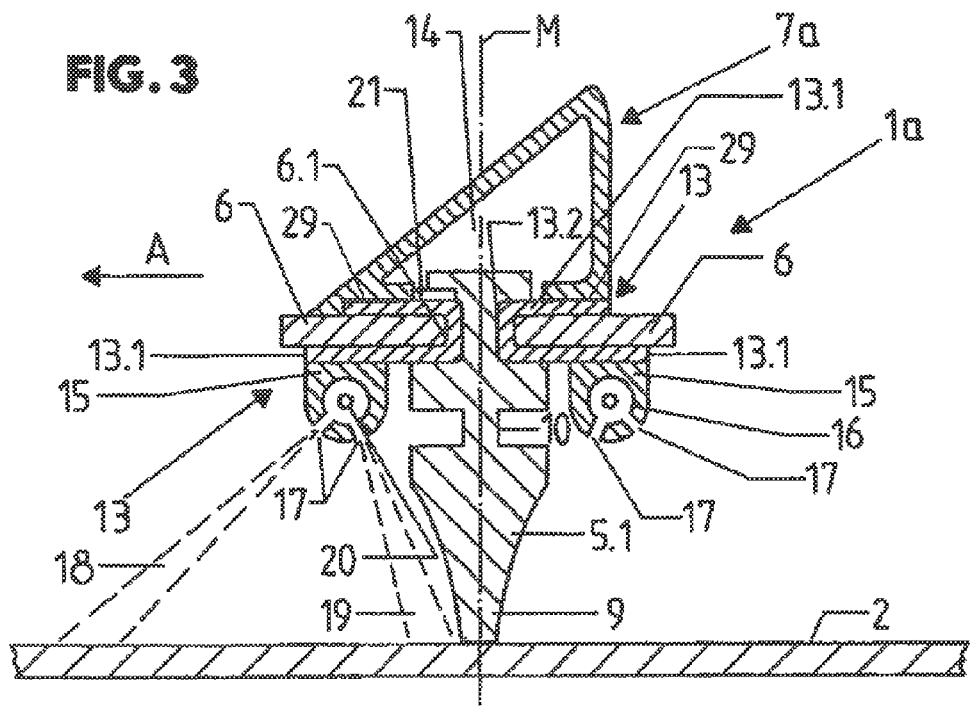
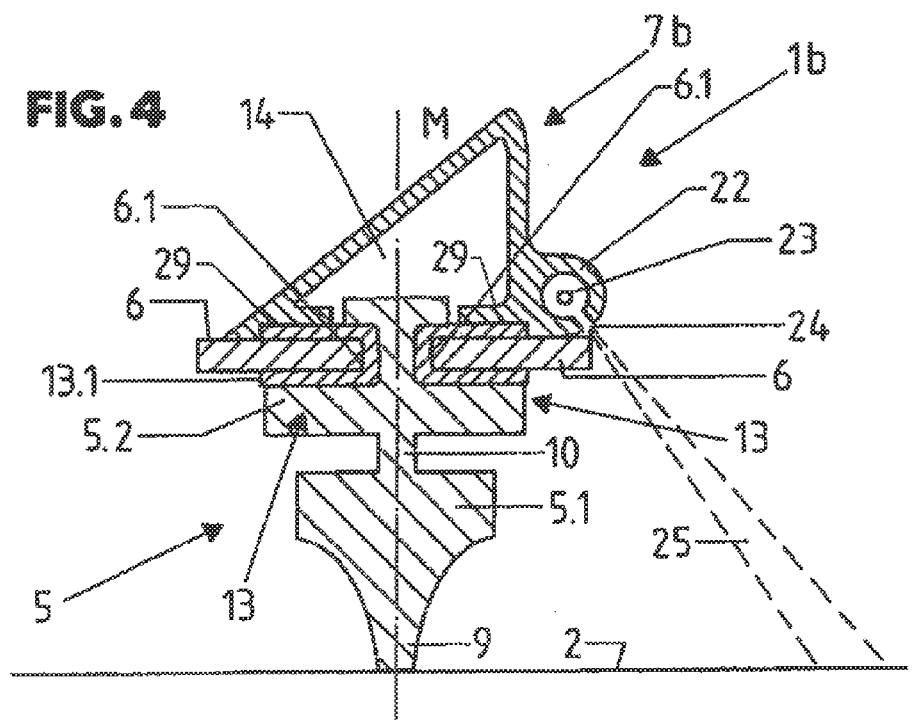

WIPER BLADE

The invention refers to a wiper blade in the form of a flat wiper blade with a spoiler on the upper side of the wiper blade according to the generic term in patent claim 1.

Flat wiper blades or flat wiper-blades, which are also frequently known as flat bar wiper blades, involve in the sense of the invention bow-structured or bow structure-free wiper blades, which in the manner known to the person skilled in the art, consist of the wiping rubber forming at least one wiping lip and of a support element, which is formed in the simplest case of at least one spring rail. Examples of flat wiper blades include for example those with two spring rails forming the support element, which extend along one longitudinal side of the wiper blade respectively and between which the wiping rubber is retained.

It is also known however to design flat wiper blades of this kind with at least one wiper blade spoiler. In one type of these flat wiper blades (DE 100 07 800 A1, DE 101 20 467 A1), the wiper blade spoiler is formed of at least one independent spoiler profile which, for its attachment, positively overlaps the two spring rails that receive the actual wiping element and the wiping rubber between them on external longitudinal edges of the spring rails facing away from each other. The disadvantage in this case among other aspects is that this design inevitably results in an increased overall width of the wiper blade, which among other aspects negatively affects the wiping behaviour and markedly induces a significant impairment of the view for the user or driver of a vehicle during wiping operation.

Flat wiper blades are furthermore known in which the spoiler or the spoiler profile are manufactured in one piece with the wiping rubber (DE 100 00 379 A1, DE 100 33 779 A1). The disadvantage in this case among other aspects is that the manufacture of wiper blades with and without a spoiler requires different wiping rubber profiles and also the wiping rubber, which forms the actual expendable part of a wiper blade, cannot be individually replaced.

The purpose of the invention is to demonstrate a flat wiper blade that avoids the aforementioned disadvantages and with a reduced wiper blade width, allows replacement of the wiping rubber independently from the remaining elements of the wiper blade. In order to solve this problem, a flat wiper blade according to patent claim 1 is developed.

The particularity of the invention lies in the fact that the spoiler profile is retained on at least one peripheral area facing the wiping rubber, i.e. internal peripheral area, of the at least one spring rail and preferably by the fact that the spoiler profile positively encompasses the internal peripheral area of the at least one spring rail.

Further developments, advantages and application possibilities of the invention are also apparent from the following description of examples of embodiment and from the figures. In this case, all the characteristics described and/or illustrated are in themselves or in any desired combination fundamentally a subject of the invention, regardless of their summary in the claims or their backward relation. The contents of the claims are also made an integral part of the description.

The invention is described below in further detail in examples of embodiment based on the figures:

FIG. 1 shows a simplified representation and lateral view of a flat wiper blade for a windscreen wiper module, together with a partial representation of a wiper arm bearing the wiper blade;

FIG. 2 shows a section through the flat wiper blade in FIG. 1;

FIGS. 3 and 4 show an illustration similar to that of FIG. 2 with further embodiments of the invention.

Figure 5:
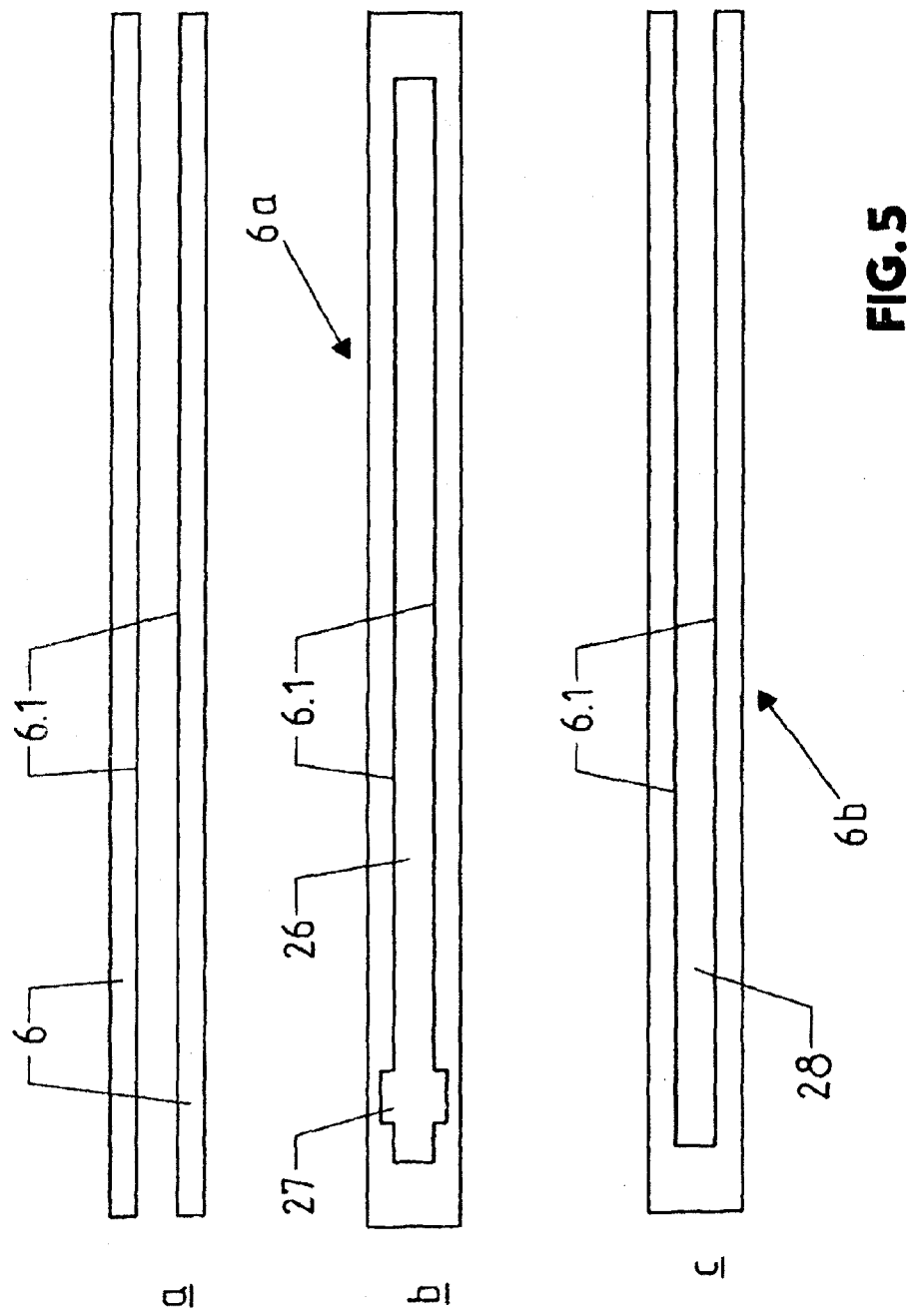
FIG. 5 shows a schematic representation of various different embodiments of the spring rail of the wiper blade.

In FIGS. 1 and 2, 1 is a flat wiper blade of a windscreen wiper module for vehicle windscreens, for example vehicle front windscreens 2. The flat wiper blade 1, which is flexibly connected in its wiper arm centre to a drivable and pivotable wiper arm 4 by means of an adapter 3 and which is illustrated in FIG. 1 in a state slightly raised from the vehicle windscreen 2, comprises among other aspects a wiping rubber 5 extending over the entire length of the flat wiper blade 1, two support elements in the form of flat spring rails 6 likewise extending over the entire length of the flat wiper blade 1 and two spoiler profiles 7. These form the upper side of the flat wiper blade 1 facing away from the vehicle windscreen 2 and each extend respectively starting from the adapter 3 to one end of the flat wiper blade 1. End pieces or end caps 8 are fixed to both wiper blade ends, which cover the spring rails 6, the spoiler profile 7 and also partially the wiping rubber 5 at the respective end and connect these elements to one another. In the wiper blade centre, the wiping rubber 5 and the two spring rails 6 are held together by the adapter 3 at this position.

In detail, the wiping rubber 5 manufactured from a rubbery-elastic material, for example from rubber or a rubbery-elastic plastic and shaped mirror-symmetrically to a central plane M, is designed in the embodiment presented with a profile section 5.1 that presents the wiping lip 9 which is in contact with the vehicle windscreen 2 at least during wiping operation and with a profile section 5.2 that adjoins the profile section 5.1 by means of a tilting ridge 10. The profile section 5.2 is equipped on both longitudinal sides of the wiping rubber 5 with a groove 11 respectively extending over the entire length of the wiping rubber 5 and open at the side, which serves in the manner described in further detail below in conjunction with the flat spring rails 6 manufactured from spring steel and forming the actual supporting element of the wiper blade 1 for positive attachment of the spoiler profiles 7. The width presented by the profile section 5.2 in an axial direction vertically to the central plane M is considerably greater below the grooves 11 than above these grooves.

The respective spoiler profile 7 essentially consists of a profile section 12 with two shanks 12.1 and 12.2, which form the spoiler shape, in addition to two U-shaped mounting profiles 13 having two shanks 13.1 respectively, connected to each other by means of a yoke section 13.2. The two shanks 12.1 and 12.2, which merge into each other on the upper side of the spoiler profile 7, are respectively connected at their lower ends extending in the longitudinal direction of the spoiler profile to the top shank 13.1 of one of the mounting profiles 13. With its closed side, i.e. with its yoke section 13.2 to the front respectively, each U-shaped mounting profile 13 is inserted in a groove 11, so that it is open on the respective longitudinal side of the flat wiper blade 1 and the shanks 13.1 of the mounting profiles 13 are oriented vertically in relation to the central plane M. In order to achieve a sufficiently firm connection between the respective shank 12.1 and 12.2 and the corresponding mounting profile 13 and the shank 13.1 at this position, the shanks 12.1 and 12.2 are respectively provided with an angling 12.1.1 and 12.2.1, which projects over the inside of the shank 12.1 and 12.2. Owing to the reduced width of the profile section 5.2 above the grooves 11, space is created for the anglings 12.1.1 and 12.2.1.

The profile section 12 is manufactured for example from a softer, elastic material, for instance from a soft or softer elastic plastic. The mounting profiles 13 consist of a material or plastic with a greater hardness than that of the plastic of the profile section 12, for example PP.

The connection between the mounting profiles 13 and the shanks 12.1 and 12.2 is established by a suitable technique, for example by gluing, welding and/or linking, etc., as shown in FIGS. 2-4 by reference number 29, Preferably, the spoiler profile 7 is manufactured by coextrusion of the profile section 12 and the mounting profiles 13.

A spring rail 6 is inserted in each mounting profile 13 engaging in a groove and open at the side and indeed in such a manner that this spring rail is oriented with its surface sides vertically in relation to the central plane M and is encompassed respectively on a subsection or peripheral area 6.1 facing the wiping rubber 5 or the central plane M or internal subsection or peripheral area by a mounting profile 13, so that the spoiler profiles 7 are retained on these peripheral areas 6.1 of the spring rails 6 and the connection between the spring rails 6 and the wiping rubber 5 is simultaneously established by means of the mounting profiles 13 engaging in the grooves 11. A portion of the width of the spring rails 6 projects respectively over the respective longitudinal side of the wiping rubber 5 and the spoiler profile 7. By means of the two spring rails which are connected to each other at the end pieces 8 and also in the area of the adapter positively overlapping the spring rails 6, the mounting profiles 13 are simultaneously secured over their entire length in the respective groove 11.

A particularity of the flat wiper blade 1 lies among other aspects in the fact that the two spoiler profiles 7 and the wiping rubber 5 are independent components, yet the spoiler profiles 7 do not project laterally or at any rate only insignificantly over the longitudinal sides of the wiping rubber 5 and under no circumstances however over the external longitudinal sides of the spring rails facing away from each other; therefore a particularly slender construction for the flat wiper blade 1 in the axial direction vertically in relation to the central plane M results and indeed with the advantage among other aspects of improved function and enhanced visibility during wiping operation. A further advantage of the flat wiper blade 1 also lies in the fact that the respective spoiler profile 7 forms a cavity 14 after installation and consequently an at least appreciable reduction in the mass results and therefore also in the moments that need to be generated by the wiper drive during wiping operation for acceleration of the wiper arm 4 at the reversal points of the to-and-fro pivoting movement of the wiper arm 4.

FIG. 3 shows flat wiper blade 1a as a further embodiment, which only essentially differs from the flat wiper blade 1 in that on the bottom shanks 13.1, i.e. those facing the wiping lip 9, of the two mounting profiles 13, a tube-like section 15 extending over the entire length of the respective spoiler profile 7a is formed respectively, which forms a fluid or washing duct 16 for a cleaning or washing fluid (generally water with cleaning and/or antifreeze additives if necessary) with a large number of jet openings 17 for application of the cleaning or washing fluid to the vehicle windscreen 2. The control of a windscreen wiper and washing module equipped with wiper blades 1a is preferably performed in this case such that during wiping operation, the fluid or washing duct 16 located on the longitudinal side of the wiper blade running ahead in relation to the current movement A of the flat wiper blade 1a is charged with the cleaning and washing fluid, so that the cleaning and washing fluid is applied to the vehicle windscreen 2 by means of the jet openings 17 ahead of the movement A of the wiping lip 9, as implied in FIG. 3 by the jets of fluid 18 and 19 shown there.

In order to avoid freezing of the flat wiper blade 1a and the fluid or washing ducts 16 and the jet openings 17, it may be appropriate to design the flat wiper blade 1a as electrically heatable and indeed by use of at least one electric heating element, e.g. in the form of a heated filament 20 arranged in the fluid or washing ducts 16 or in the form of electric heating foils provided internally on the profile section 12, for example at the transition to the respective mounting profile 13 or however in or on the respective mounting profile 13.

FIG. 4 shows a flat wiper blade 1b as a further embodiment, which essentially only differs from the flat wiper blade 1 in FIGS. 1 and 2 in that on the profile section 12 and in this case on the shank 12.1 externally, a tube-like section is formed extending for example over the entire length of the spoiler profile 7b, which again forms at least one fluid or washing duct 22 for a washing and cleaning fluid and to be more precise with a large number of jet openings 24 distributed along this duct. The section 22 and the jet openings 24 are located in this case above the upper side of the one spring rail 6 facing away from the wiping lip 9 and indeed in such a manner that the jets 25 emerging from the jet openings 24 during wiping and washing operation impinge unimpeded by the spring rail onto the vehicle windscreen 2.

In the wiper blades 1a and 1b, the profile section 12 with the corresponding mounting profiles 13 is again connected in a suitable manner; preferably, the profile section 12 and the mounting profiles 13 including the sections 15 and 22 are in turn manufactured by coextruding from different plastics and to be more precise, the profile section 12 with the corresponding tube-like section 22 if appropriate from a softer plastic and the mounting profiles with the tube-like sections 15 from a plastic of greater hardness.

In FIG. 5, different embodiments of the spring rails for the wiper blade 1 are represented at positions a-c and indeed at position a, initially the two spring rails 6 that each form a peripheral area 6.1 respectively.

At position b, a spring rail 6a with an elongated hole 26 is illustrated, which forms two peripheral areas 6.1 opposite each other on its longitudinal sides and into which the wiper blade 5 with the spoiler profiles 7 temporarily retained on this wiper blade is pushed in by means of an expansion 27 in such a manner that the spoiler profiles 7 in turn overlap the two peripheral areas 6.1 with their mounting sections 13 received in the grooves 11 of the wiper blade 5.

At position c, a spring rail 6b is illustrated that presents an open elongated hole 28 at the end of this spring rail and again forms a peripheral area 6.1 on each longitudinal side of this elongated hole. Analogously to the spring rail 6a, in this embodiment, the wiper blade with the spoiler profile 7 temporarily retained on the latter is pushed into the elongated hole 28 from the open side in such a manner that the spoiler profiles 7 in turn overlap the two peripheral areas 6.1 with their mounting sections 13 received in the grooves 11 of the wiper blade.

The invention has been described above based on examples of embodiment. It is understood that modifications and variations are possible without departing as a result from the concept on which the invention is based.

LIST OF REFERENCES

1, 1a, 1b flat wiper blade
2 vehicle windscreen
3 adapter
4 wiper arm
5 wiping rubber
5.1, 5.2 profile section of the wiping rubber 5

6, 6a, 6b spring rail
6.1 internal peripheral area of the spring rails
7, 7a, 7b spoiler profile
8 end element
9 wiping lip
10 tilting ridge
11 groove
12 profile section of the spoiler profile 7
12.1, 12.2 shank of the profile section 12
12.1.1, 12.2.1 angling
13 mounting profile
13.1 shank
13.2 yoke section
14 cavity
15 tube-like section on the mounting profile 13
16 fluid or injection duct
17 jet opening
18, 19 spray jet
20 heated filament
21 heating foil
22 tube-like section
23 fluid or washing duct
24 jet opening
25 spray jet
26 elongated hole
27 expansion
28 elongated hole
A direction of movement
M wiper blade central plane

The invention claimed is:

1. A wiper blade for vehicle windscreen washer modules, comprising:
 a wiping rubber forming a wiping lip, wherein the wiper blade is a flat wiper blade;
 at least two spring rails, extending in the longitudinal direction of the wiper blade, spaced apart from one another and receiving the wiping rubber in an area of a subsection between them, wherein the at least two spring rails laterally project over the wiping rubber, and wherein the at least two spring rails extend laterally beyond a plurality of grooves in the wiping rubber, the plurality of grooves enclosing portions of the at least two spring rails;
 at least one spoiler profile connected to the spring rails and manufactured as an independent profile;
 a first U-shaped mounting part having a first shank, the first shank of the first U-shaped mounting part coupled to a first side of the at least one spoiler profile such that the at least one spoiler profile is coupled to a first spring rail; and
 a second U-shaped mounting part having a second shank, the second shank of the second U-shaped mounting part coupled to a second side of the at least one spoiler profile such that the at least one spoiler profile is coupled to a second spring rail,
 wherein each of the first shank and the second shank have an end terminating with a side facing outwardly,
 wherein the first U-shaped mounting part and the second U-shaped mounting part are disposed on opposite sides of the wiping rubber,
 wherein the first U-shaped mounting part engages an internal peripheral area of the first spring rail facing the wiping rubber, the first U-shaped mounting part is located between the first spring rail and a first groove of the wiping rubber, and
 wherein the second U-shaped mounting part engages an internal peripheral area of the second spring rail facing the wiping rubber, the second U-shaped mounting part is located between the second spring rail and a second groove of the wiping rubber.

2. The wiper blade according to claim 1, wherein the at least one spoiler profile comprises at least two mounting sections or profiles for attachment, which are positively connected to a peripheral area facing the wiping rubber or internal peripheral area of the at least one spring rail.

3. The wiper blade according to claim 2, wherein the first U-shaped mounting part and the second U-shaped mounting part engage in recesses or grooves on longitudinal sides of the wiping rubber.

4. The wiper blade according to claim 3, wherein the first U-shaped mounting part and the second U-shaped mounting part are each respectively secured by the at least one spring rail on the wiping rubber or in the corresponding recess or groove of the wiping rubber.

5. The wiper blade according to claim 2, wherein the first U-shaped mounting part, the second U-shaped mounting part, the at least one spoiler profile are made of plastics with different hardness.

6. The wiper blade according to claim 5, wherein the at least one spoiler profile is connected to the first U-shaped mounting part and the second U-shaped mounting part by one of gluing, welding or linking.

7. The wiper blade according to claim 2, wherein the at least one spoiler profile, the first U-shaped mounting part, and the second U-shaped mounting part are manufactured by extruding.

8. The wiper blade according to claim 1, wherein, on the at least one spoiler profile, at least one fluid or washing duct is provided, extending over at least a partial length of the wiper blade or the at least one spoiler profile with jet openings for application of a washing and/or cleaning fluid to the vehicle windscreen.

9. The wiper blade according to claim 8, wherein the at least one fluid or washing duct is provided on one of the first U-shaped mounting part or the second U-shaped mounting part.

10. The wiper blade according to claim 9, wherein the at least one washing or fluid duct is provided on a section of one of the first U-shaped mounting part or the second U-shaped mounting part outside the wiping rubber.

11. The wiper blade according to claim 8, wherein the at least one fluid or washing duct is provided on the at least one spoiler profile.

12. The wiper blade according to claim 11, wherein the at least one spoiler profile is formed by at least two adjacent wall sections or shanks, and wherein the at least one spoiler profile is connected on edges of the shanks extending in the longitudinal direction of the wiper blade to the wiping rubber, by the first U-shaped mounting part and the second U-shaped mounting part.

13. The wiper blade according to claim 12, wherein the at least two adjacent wall sections or shanks merge into each other on an upper side of the spoiler profile, and are respectively connected at lower ends extending in the longitudinal direction of the spoiler profile to the first shank of the first U-shaped mounting part and the second shank of the second U-shaped mounting part.

14. The wiper blade according to claim 11, wherein the wiper blade comprises a cavity within the at least one spoiler profile.

15. The wiper blade according to claim 8, further comprising means for electric heating of the wiper blade and/or the at least one washing or fluid duct and the jet openings of the washing or fluid duct.

16. The wiper blade according to claim 1, wherein the at least one spoiler profile is retained in a manner that encompasses an internal peripheral area of the at least one spring rail.

17. A wiper blade for vehicle windscreen washer modules, comprising:
- a wiping rubber forming a wiping lip, wherein the wiper blade is a flat wiper blade;
- at least two spring rails, extending in the longitudinal direction of the wiper blade, spaced apart from one another and receiving the wiping rubber in an area of a subsection between them, wherein the at least two spring rails laterally project over the wiping rubber, and wherein the at least two spring rails extend laterally beyond a plurality of grooves in the wiping rubber, the plurality of grooves enclosing portions of the at least two spring rails;
- at least one spoiler profile connected to the spring rails and manufactured as an independent profile;
- a first U-shaped mounting part having a first shank, the first shank of the first U-shaped mounting part coupled to a first side of the at least one spoiler profile such that the at least one spoiler profile is coupled to a first spring rail; and
- a second U-shaped mounting part having a second shank, the second shank of the second U-shaped mounting part coupled to a second side of the at least one spoiler profile such that the at least one spoiler profile is coupled to a second spring rail,
- wherein each of the first shank and the second shank have an end terminating with a side facing outwardly,
- wherein the first shank and the second shank are disposed on opposite sides of the wiping rubber,
- wherein the first shank engages an internal peripheral area of a first spring rail facing the wiping rubber, the first shank is located between the first spring rail and a first groove of the wiping rubber, and
- wherein the second shank engages an internal peripheral area of a second spring rail facing the wiping rubber, the second shank is located between the second spring rail and a second groove of the wiping rubber.

18. A wiper blade for vehicle windscreen washer modules, comprising:
- a wiping rubber forming a wiping lip, wherein the wiper blade is a flat wiper blade;
- at least two spring rails, extending in the longitudinal direction of the wiper blade, spaced apart from one another and receiving the wiping rubber in an area of a subsection between them, wherein the at least two spring rails laterally project over the wiping rubber, and wherein the at least two spring rails extend laterally beyond a plurality of grooves in the wiping rubber, the plurality of grooves enclosing portions of the at least two spring rails;
- at least one spoiler profile connected to the spring rails and manufactured as an independent profile;
- a first U-shaped mounting part having a first shank, the first shank of the first U-shaped mounting part coupled to a first side of the at least one spoiler profile such that the at least one spoiler profile is coupled to a first spring rail; and
- a second U-shaped mounting part having a second shank, the second shank of the second U-shaped mounting part coupled to a second side of the at least one spoiler profile such that the at least one spoiler profile is coupled to a second spring rail,
- wherein the first U-shaped mounting part and the second U-shaped mounting part are disposed on opposite sides of the wiping rubber,
- wherein the first U-shaped mounting part engages an internal peripheral area of the first spring rail facing the wiping rubber, the first U-shaped mounting part is located between the first spring rail and a first groove of the wiping rubber,
- wherein the second U-shaped mounting part engages an internal peripheral area of the second spring rail facing the wiping rubber, the second U-shaped mounting part is located between the second spring rail and a second groove of the wiping rubber, and
- wherein the spoiler profile contacts the spring rails and is adhesively connected to both the first U-shaped mounting part and the second U-shaped mounting part.

19. A wiper blade for vehicle windscreen washer modules, comprising:
- a wiping rubber forming a wiping lip, wherein the wiper blade is a flat wiper blade;
- at least two spring rails, extending in the longitudinal direction of the wiper blade, spaced apart from one another and receiving the wiping rubber in an area of a subsection between them, wherein the at least two spring rails laterally project over the wiping rubber, and wherein the at least two spring rails extend laterally beyond a plurality of grooves in the wiping rubber, the plurality of grooves enclosing portions of the at least two spring rails;
- at least one spoiler profile connected to the spring rails and manufactured as an independent profile;
- a first U-shaped mounting part having a first shank, the first shank of the first U-shaped mounting part coupled to a first side of the at least one spoiler profile such that the at least one spoiler profile is coupled to a first spring rail; and
- a second U-shaped mounting part having a second shank, the second shank of the second U-shaped mounting part coupled to a second side of the at least one spoiler profile such that the at least one spoiler profile is coupled to a second spring rail,
- wherein the first shank and the second shank are disposed on opposite sides of the wiping rubber,
- wherein the first shank engages an internal peripheral area of a first spring rail facing the wiping rubber, the first shank is located between the first spring rail and a first groove of the wiping rubber,
- wherein the second shank engages an internal peripheral area of a second spring rail facing the wiping rubber, the second shank is located between the second spring rail and a second groove of the wiping rubber, and
- wherein the spoiler profile contacts the spring rails and is adhesively connected to both the first U-shaped mounting part and the second U-shaped mounting part.

* * * * *